United States Patent [19]
Muller

[11] 3,935,921
[45] Feb. 3, 1976

[54] ENGINE ENCLOSURE HAVING A COUNTERWEIGHT MOUNTING DEVICE SECURED THEREON

[75] Inventor: Thomas P. Muller, Aurora, Ill.

[73] Assignee: Caterpillar Tractor Co., Peoria, Ill.

[22] Filed: Sept. 12, 1974

[21] Appl. No.: 505,587

Related U.S. Application Data

[62] Division of Ser. No. 326,996, Jan. 26, 1973, Pat. No. 3,869,018.

[52] U.S. Cl................................................ 180/89 R
[51] Int. Cl............................................ B62d 33/06
[58] Field of Search......... 180/89 R; 296/102, 28 C; 52/263, 648; 214/142; 280/150 E

[56] References Cited
UNITED STATES PATENTS

| | | | |
|---|---|---|---|
| 2,053,462 | 9/1936 | Chaplin | 52/648 |
| 3,501,021 | 3/1970 | Schreier et al. | 214/142 X |
| 3,524,563 | 8/1970 | McCartney et al. | 180/89 R X |
| 3,632,134 | 1/1972 | Babbitt | 296/102 |
| 3,687,484 | 8/1972 | Cosby | 280/150 E |
| 3,795,330 | 3/1974 | Jorgensen | 214/138 R X |

Primary Examiner—Kenneth H. Betts
Attorney, Agent, or Firm—Phillips, Moore, Weissenberger Lempio & Strabala

[57] ABSTRACT

An engine enclosure comprises a support frame having a pair of vertically disposed rear posts interconnected at their upper ends to a pair of vertically disposed center posts by tie rods. A counterweight mounting device is secured on the outside of the rear posts to form an integral part thereof.

3 Claims, 7 Drawing Figures

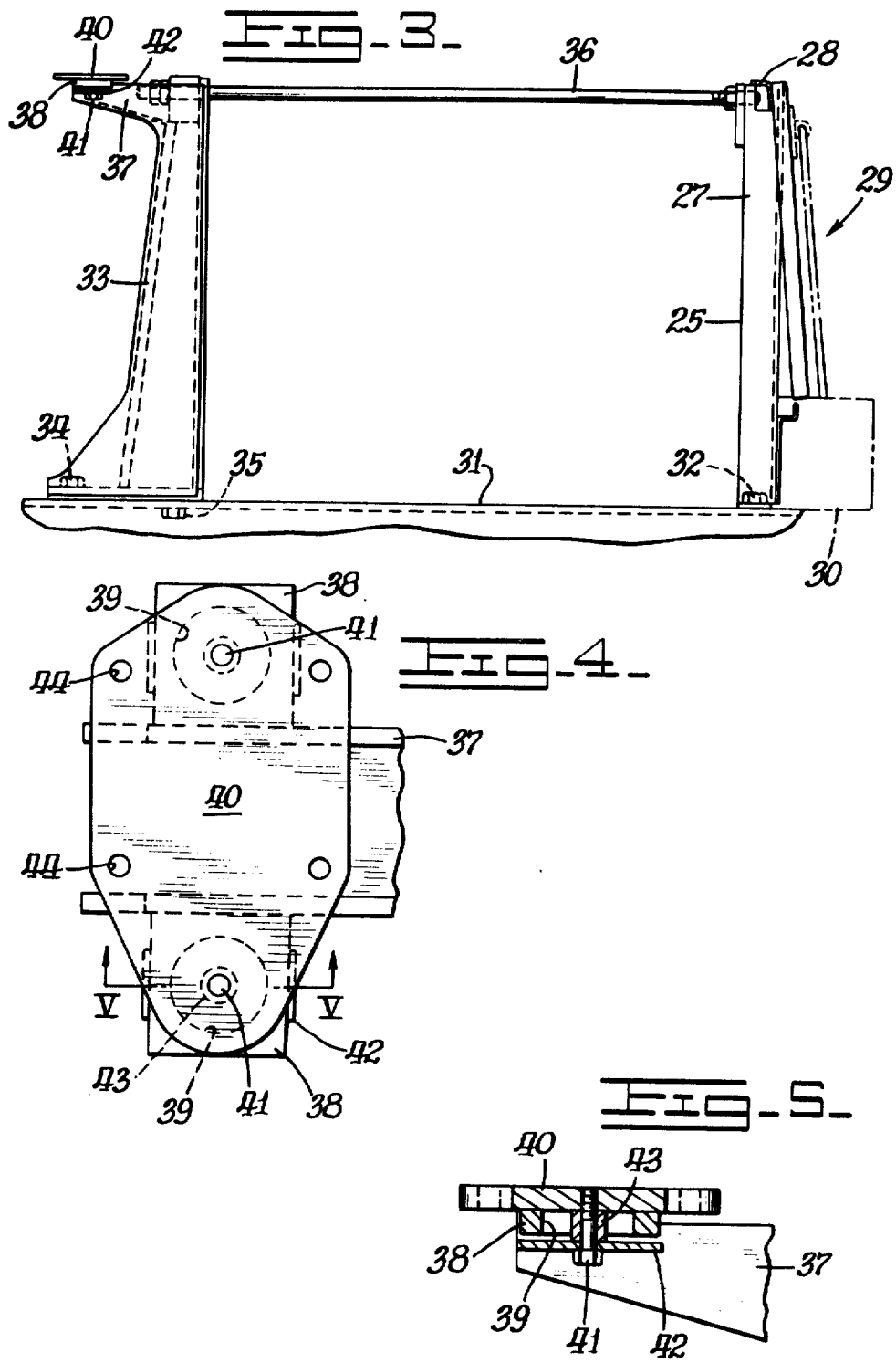

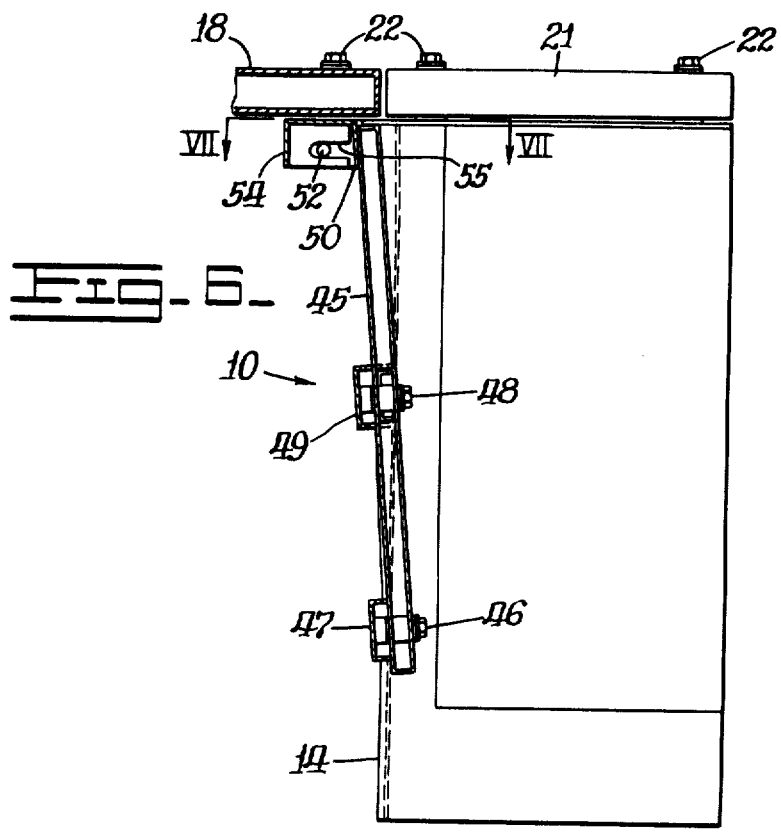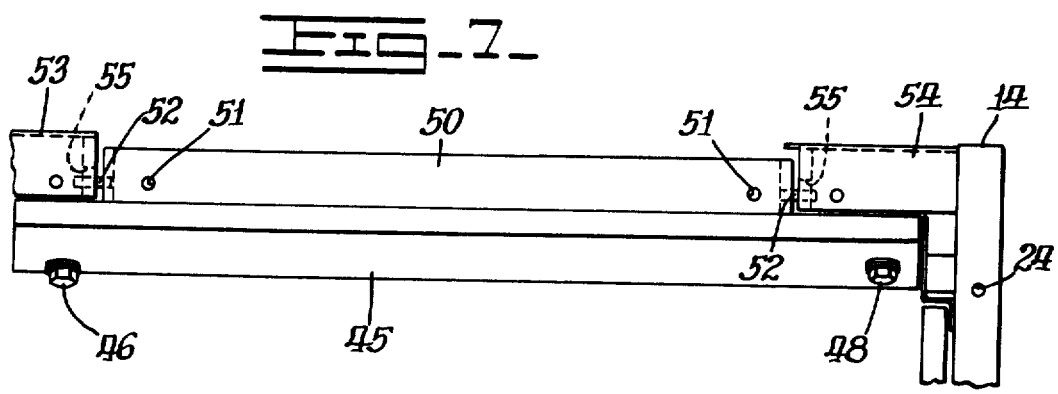

ENGINE ENCLOSURE HAVING A COUNTERWEIGHT MOUNTING DEVICE SECURED THEREON

This is a division of Ser. No. 326,996, filed Jan. 26, 1973, now U.S. Pat. No. 3,869,018.

BACKGROUND OF THE INVENTION

An enclosure normally covers and protects the engine, hydraulic pumps, valves and other working components of a hydraulic excavator. The engine may be mounted at the rear of the excavator's rotatable upper unit to aid in counter-balancing the boom and attached implement mounted on the front of the upper unit. Additional counterweights are oftentimes releasably attached on the rear of the upper frame to further aid in such counterbalancing during excavator operation.

A counterweight installation and removal device, such as the one disclosed in U.S. application Ser. No. 254,496, filed on May 18, 1972, by Stanley A. Jorgensen et al for "COUNTERWEIGHT SUSPENSION DEVICE", now U.S. Pat. No. 3,795,330 and assigned to the assignee of this application, may be attached on the engine's enclosure to aid in the mounting and demounting of such counterweights. Heavy structural supports are normally required at the rear of the enclosure to accommodate the heavy loads imposed thereon by the counterweights. Such supports are bulky and unduly increase the complexity and overall length of the enclosure.

The standard enclosure normally comprises a frame structure having a plurality of panels removably secured thereon to provide access to the aforementioned working components disposed therein. A stack-up of manufacturing and assembly tolerances frequently results in the misalignment of attachment holes formed through the panels and in the underlying frame structure. Thus, new attachment holes compensating for such misalignment, must be formed through the panels or frame structure during assembly of the enclosure.

Summary of the Invention

An object of this invention is to overcome the above, briefly described problems by providing a non-complex and economical enclosure particularly adapted to protect working components of a vehicle, which exhibits a high degree of protection, structural integrity, and ability to be fabricated expeditiously. The enclosure comprises a frame structure which is adapted to accommodate heavy loads imposed thereon when a counterweight is attached on the rear of the vehicle, for example. The frame structure comprises pairs of longitudinally aligned center and rear posts secured to the vehicle's main frame and interconnected by force transmitting means to transmit loading forces to the center posts and main frame directly. The center posts each preferably have a substantially large base secured thereon to aid in such load transmitting desiderata.

In addition, each center post preferably has a mounting pad adjustably mounted thereon to compensate for the misalignment of attachment holes formed in the frame structure and through a top panel attached thereto. At least one side panel is preferably attached on the enclosure for adjustment to compensate for misalignment between the upper end thereof and a connected top panel.

BRIEF DESCRIPTION OF THE DRAWINGS

Further objects of this invention will become apparent from the following description and accompanying drawings wherein:

FIG. 3 is an enlarged side elevational view of a portion of the frame structure, taken in the direction of arrows III—III in FIG. 2;

FIG. 4 is enlarged, top plan view of a mounting pad for mounting top panels of the enclosure on the frame structure;

FIG. 5 is a sectional view of the mounting pad, taken in the direction of arrows V—V in FIG. 4;

FIG. 6 is an enlarged sectional view of the enclosure, taken in the direction of arrows VI—VI in FIG. 1; and FIG. 7 is a top plan view, taken in the direction of arrows VII—VII in FIG. 6 and rotated 90 degrees.

DETAILED DESCRIPTION

Figure 1:
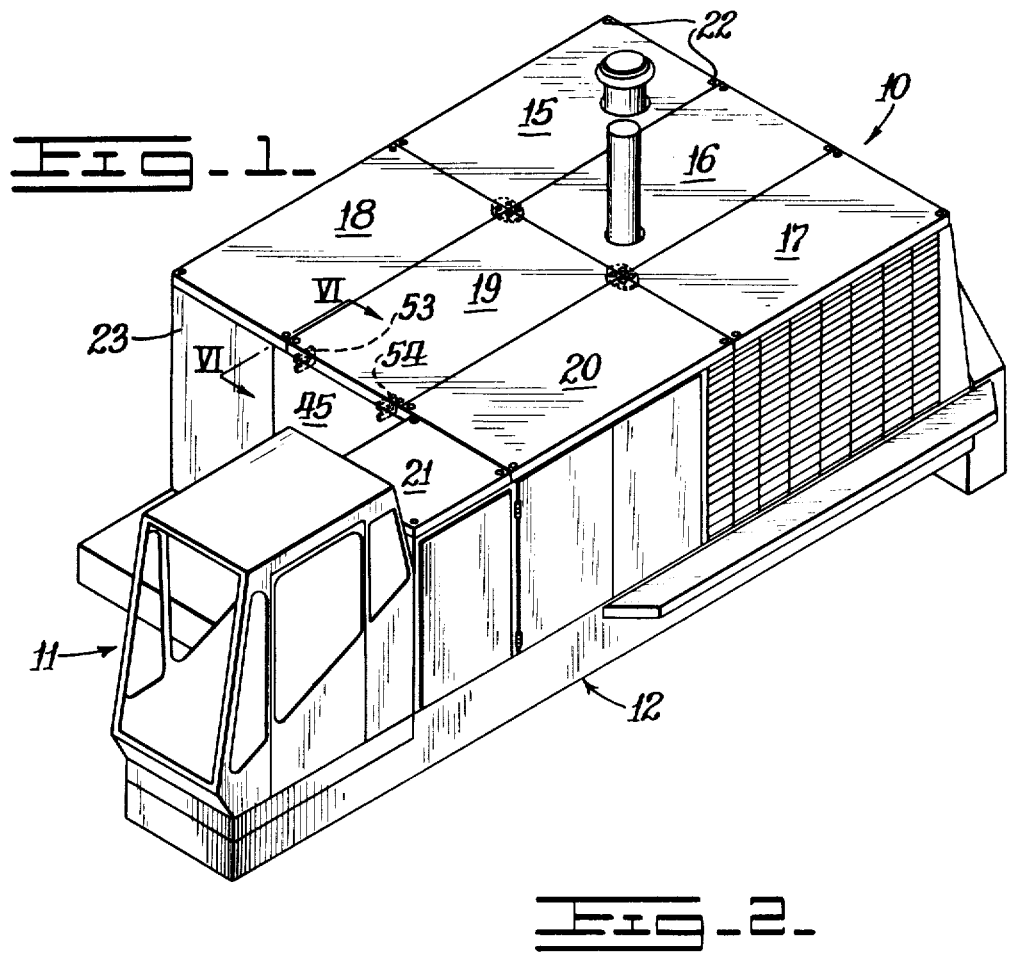
FIG. 1 is an isometric view of an engine enclosure for the upper unit of a hydraulic excavator.
Figure 2:
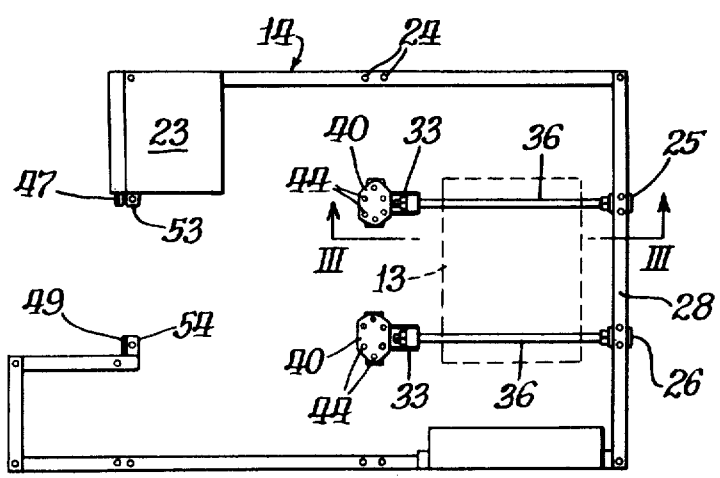
FIG. 2 is a top plan view of a frame structure employed in the enclosure.

FIG. 1 illustrates an engine enclosure 10 and operator's cab 11 mounted on a rotatable upper unit 12 of a hydraulic excavator (not fully shown). As shown in FIG. 2, engine 13 is disposed in the enclosure to aid in counter-balancing a boom and attached implement (not shown) movably mounted on a front end of the upper unit in a conventional manner. The upper unit comprises a main support frame 14 having a plurality of rectangular top panels 15-21 secured thereon by fastening means such as bolts 22, each disposed at a corner of each panel.

A fuel tank 23, mounted at a front corner of the enclosure, is integrally secured to the main frame. A plurality of threaded attachment holes 24 (FIG. 2) are formed in the frame members for receiving the threaded ends of bolts 22. A pair of laterally spaced and upright posts 25 and 26 each preferably comprise a U-shaped channel member 27 secured at its upper end to an L-shaped cross-bar 28, extending transversely the full width of the main frame (FIG. 3).

A counterweight mounting device 29, such as the type disclosed in above mentioned U.S. Pat. application Ser. No. 254,496, is secured on the outside of the rear posts to removably mount one or more counterweights 30 thereon. The rear posts are further secured at their lower ends to a rear end of longitudinally disposed main frame members 31 by bolts 32. A pair of laterally spaced and upright center posts 33 each have a substantially large base or pedestal secured to its lower end and attached to members 31 by bolts 34 and 35.

The center posts may each comprise a plurality of plates suitably welded together to form a box-section exhibiting a substantially higher structural rigidity and strength than a longitudinally aligned rear post. Force transmitting means, such as tie rods 36, interconnect the upper ends of the center and rear posts. Such construction increases the structural rigidity of the rear posts to accommodate the loads imposed thereon by counterweight 30.

Referring to FIGS. 3-5, each center post further comprises a forwardly extending and cantilevered section 37 having a pair of ear-like mounting brackets 38 extending laterally therefrom. Each bracket has a vertical bore 39 formed therethrough, as clearly shown in FIGS. 4 and 5. A mounting plate 40 is releasably attached on the brackets by a pair of bolts 41, extending through a retainer plate 42 disposed beneath the brackets. A spacer bushing 43, mounted on each bolt and disposed between the retainer and mounting plates, has a diameter which is substantially less than the diameter of circumventing bore 39 to provide limited horizontal adjustment of the mounting plate on the brackets. The mounting plate has a plurality of threaded attachment holes 44 formed therethrough, adapted to receive the threaded ends of bolts 22 therein.

Referring to FIGS. 6 and 7, enclosure 10 has a substantially vertical front panel 45 disposed centrally at the front thereof. One side of the panel is positioned adjacent to fuel tank 23 (FIG. 1) and one lower corner thereof is secured by fastening means, such as a bolt 46, to a support bracket 47 extending laterally inwardly from the fuel tank. The opposite side of the panel is fastened intermediate to its upper and lower ends by a bolt 48 to a support bracket 49, extending laterally inwardly from the main frame.

A transversely disposed bracket 50 is integrally secured to the upper, back edge of front panel 45 and has a pair of threaded attachment holes 51 formed therein and a cylindrical pin or rod 52 projecting outwardly from each lateral end thereof. A first member 53 extends laterally inwardly from the fuel tank and a second member 54 extends laterally inwardly from the support frame. Such members are in substantial alignment with bracket 50 and each has a horizontally disposed and forwardly opening U-shaped slot 55 formed therein to receive rod 52 to provide a pin and slot connection thereat. During assembly of the enclosure, bolts 46 and 48 may be loosened to permit fore and aft adjustment of front panel 45 and bracket 50 to precisely align the mounting holes formed through panel 18 with threaded attachment holes 51 of underlying bracket 50 for reception of bolts 22 therein.

I claim:
1. An enclosure comprising:
   a horizontally disposed and longitudinally extending main frame,
   at least one pair of upright rear posts secured at their lower ends on a rearward end of said frame,
   at least one pair of upright center posts secured at their lower ends on said frame and spaced longitudinally forwardly from said rear posts intermediate forward and rearward ends thereof to extend upwardly therefrom,
   force transmitting means interconnecting upper ends of each pair of said rear and center posts for transmitting loading forces imposed on said rear posts to said center posts and frame directly, and
   a counterweight mounting device secured on the outside of said rear posts to form an integral part thereof for selectively mounting a counterweight thereon.

2. The enclosure of claim 1 further comprising a counterweight removably mounted in a fixed position on a lower end of said counterweight mounting device.

3. The enclosure of claim 1 further comprising an engine disposed therein to aid said counterweight in counter-balancing said enclosure when a load is imposed on a forward end thereof.

* * * * *